(12) United States Patent
Tyan et al.

(10) Patent No.: US 11,167,797 B2
(45) Date of Patent: Nov. 9, 2021

(54) MULTI-CELL ENERGY ABSORBING STRUCTURES

(71) Applicant: Ford Global Technologies, LLC, Dearborn, MI (US)

(72) Inventors: Tau Tyan, Northville, MI (US); Krish E. Aekbote, Novi, MI (US); Michael Black, Farmington Hills, MI (US); Maria J. Heirtzler, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/658,406

(22) Filed: Oct. 21, 2019

(65) Prior Publication Data

US 2021/0114663 A1 Apr. 22, 2021

(51) Int. Cl.
| | | |
|---|---|---|
| B62D 21/15 | (2006.01) |
| B60R 19/18 | (2006.01) |
| B21C 23/14 | (2006.01) |
| B62D 29/00 | (2006.01) |
| B62D 25/04 | (2006.01) |
| B62D 25/02 | (2006.01) |
| B62D 21/03 | (2006.01) |
| B60R 19/34 | (2006.01) |

(52) U.S. Cl.
CPC .............. *B62D 21/15* (2013.01); *B21C 23/14* (2013.01); *B60R 19/18* (2013.01); *B62D 29/00* (2013.01); *B60R 19/34* (2013.01); *B60R 2019/1866* (2013.01); *B62D 21/03* (2013.01); *B62D 21/157* (2013.01); *B62D 25/025* (2013.01); *B62D 25/04* (2013.01)

(58) Field of Classification Search
CPC .................. B62D 21/15; B62D 29/008; B60R 2019/264; B60R 2019/1866; B60R 19/34; B21C 23/14
USPC .............................. 296/187.04, 205; 293/133
See application file for complete search history.

(56) References Cited

U.S. PATENT DOCUMENTS

| | | | |
|---|---|---|---|
| 7,252,314 B2 * | 8/2007 | Tamura ...................... F16F 7/12 293/133 |
| 7,866,716 B2 | 1/2011 | Perucca et al. |
| 8,297,668 B2 | 10/2012 | Nakanishi et al. |
| 8,430,437 B2 * | 4/2013 | Asakawa ................ B60R 19/34 293/133 |
| 8,905,444 B2 * | 12/2014 | Zannier ................... B60R 19/34 293/132 |

(Continued)

FOREIGN PATENT DOCUMENTS

| | | |
|---|---|---|
| CN | 109591743 A | 4/2019 |
| JP | 5348910 B2 | 8/2013 |

*Primary Examiner* — Gregory A Blankenship
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a vehicle structural component that has a plurality of open cells surrounding an open center section. The open center section comprises a multi-corner open center. A method according to an exemplary aspect of the present disclosure includes, among other things, extruding a vehicle structural component from a metallic material, wherein the vehicle structural component includes a plurality of open cells surrounding an open center section, and wherein the plurality of open cells each comprise a polygonal cross-section and the open center section comprises a multi-corner open center.

21 Claims, 11 Drawing Sheets

(56) References Cited

U.S. PATENT DOCUMENTS

| | | | |
|---|---|---|---|
| 10,081,391 B1* | 9/2018 | Tyan | F16F 7/121 |
| 10,266,207 B2* | 4/2019 | Tyan | B62D 25/025 |
| 10,272,860 B2 | 4/2019 | Mohapatra et al. | |
| 10,330,168 B2* | 6/2019 | Tyan | B60R 19/34 |
| 2002/0063433 A1* | 5/2002 | Gotanda | B60R 19/34 |
| | | | 293/132 |
| 2010/0102592 A1* | 4/2010 | Tyan | B62D 21/15 |
| | | | 296/187.09 |
| 2011/0316307 A1* | 12/2011 | Di Modugno | B60R 19/34 |
| | | | 296/187.03 |
| 2012/0112479 A1* | 5/2012 | Nagwanshi | F16F 7/121 |
| | | | 293/133 |
| 2013/0119705 A1* | 5/2013 | Matuschek | B62D 21/152 |
| | | | 296/187.03 |
| 2013/0292968 A1* | 11/2013 | Tyan | B60R 19/34 |
| | | | 296/187.03 |
| 2013/0307288 A1* | 11/2013 | Wavde | B60R 19/34 |
| | | | 296/187.05 |
| 2014/0203577 A1* | 7/2014 | Nagwanshi | B60R 19/023 |
| | | | 293/120 |
| 2015/0057058 A1* | 2/2015 | Allen | A63F 13/61 |
| | | | 463/9 |
| 2016/0375935 A1* | 12/2016 | Tyan | B62D 21/02 |
| | | | 296/205 |
| 2017/0158252 A1* | 6/2017 | Milne | B32B 3/12 |
| 2017/0307137 A1* | 10/2017 | Tyan | B32B 25/08 |
| 2017/0307138 A1* | 10/2017 | Tyan | B32B 15/18 |
| 2018/0057060 A1* | 3/2018 | Tyan | B32B 25/06 |
| 2018/0290611 A1* | 10/2018 | Munjurulimana | B60R 19/34 |
| 2020/0114970 A1* | 4/2020 | Nusier | B62D 21/157 |
| 2020/0269924 A1* | 8/2020 | Watanabe | B62D 29/008 |
| 2021/0114663 A1* | 4/2021 | Tyan | B62D 21/15 |

* cited by examiner

MULTI-CELL ENERGY ABSORBING STRUCTURES

TECHNICAL FIELD

This disclosure relates generally to multi-cell energy absorbing structures that can be used for a variety of vehicle structural components.

BACKGROUND

Vehicles include various structural components such as beams, rails, cross-members, etc. These structural components should be lightweight while still being capable of absorbing high impact loads in an efficient manner.

SUMMARY

An apparatus according to an exemplary aspect of the present disclosure includes, among other things, a vehicle structural component that has a plurality of open cells surrounding an open center section. The open center section comprises a multi-corner open center.

In a further non-limiting embodiment of the foregoing apparatus, the plurality of open cells each comprise a polygonal cross-section.

In a further non-limiting embodiment of any of the foregoing apparatus, the polygonal cross-section comprises an octagonal cross-section.

In a further non-limiting embodiment of any of the foregoing apparatus, the multi-corner open center is defined by at least eight wall segments and at least eight corners.

In a further non-limiting embodiment of any of the foregoing apparatus, the multi-corner open center is defined by at least sixteen wall segments and at least sixteen corners.

In a further non-limiting embodiment of any of the foregoing apparatus, the plurality of open cells comprises four open cells.

In a further non-limiting embodiment of any of the foregoing apparatus, the vehicle structural component is defined by a length extending between first and second opposing ends, and wherein a cross-section of the vehicle structural component is constant along the length.

In a further non-limiting embodiment of any of the foregoing apparatus, the vehicle structural component comprises an extruded component made from a metallic material.

In a further non-limiting embodiment of any of the foregoing apparatus, the multi-corner open center is defined by a plurality of wall segments that connect to the plurality of open cells, wherein each wall segment has a length and a thickness, and wherein the lengths and/or thickness can be adjust independently to provide a desired stiffness and strength.

In a further non-limiting embodiment of any of the foregoing apparatus, the vehicle structural component has a width defined in a first direction between opposing outermost surfaces of first and second sides of the vehicle structural component and a height defined in a second direction between opposing outermost surfaces of third and fourth sides of the vehicle structural component, and wherein an aspect ratio of width divided by height is within a range of greater than 0.25 and less than 4.0.

In a further non-limiting embodiment of any of the foregoing apparatus, the aspect ratio is 1.0.

An apparatus, according to yet another exemplary aspect of the present disclosure includes, among other things, a vehicle structural component comprising an extruded component that is made from a metallic material. The vehicle structural component includes a plurality of open cells surrounding an open center section, wherein the plurality of open cells each comprise a polygonal cross-section and the open center section comprises a multi-corner open center.

In a further non-limiting embodiment of any of the foregoing apparatus, the open center section has a center axis and comprises a plurality of leg portions extending radially away from the center axis to distal ends, and wherein one leg portion extends between each adjacent pair of open cells.

In a further non-limiting embodiment of any of the foregoing apparatus, each open cell has a cell center, and wherein an end face of each distal end extends radially outwardly to at least the cell centers associated with the respective leg portion.

In a further non-limiting embodiment of any of the foregoing apparatus, the end face of each distal end extends radially beyond the cell centers associated with the respective leg portion.

In a further non-limiting embodiment of any of the foregoing apparatus, the polygonal cross-section comprises an octagonal cross-section, and wherein the multi-corner open center is defined by at least eight wall segments and at least eight corners.

In a further non-limiting embodiment of any of the foregoing apparatus, the multi-corner open center is defined by at least sixteen wall segments and at least sixteen corners, and wherein the plurality of open cells comprises four open cells.

In a further non-limiting embodiment of any of the foregoing apparatus, the vehicle structural component is defined by a length extending between first and second opposing ends, and wherein a cross-section of the vehicle structural component is constant along the length.

A method according to still another exemplary aspect of the present disclosure includes, among other things, extruding a vehicle structural component from a metallic material, wherein the vehicle structural component includes a plurality of open cells surrounding an open center section, and wherein the plurality of open cells each comprise a polygonal cross-section and the open center section comprises a multi-corner open center.

In a further non-limiting embodiment of the foregoing method, the polygonal cross-section comprises an octagonal cross-section, and wherein the multi-corner open center is defined by at least eight wall segments and at least eight corners.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details, among other things, exemplary multi-cell energy absorbing structures that can be used for a variety of vehicle structural components.

Figure 2:
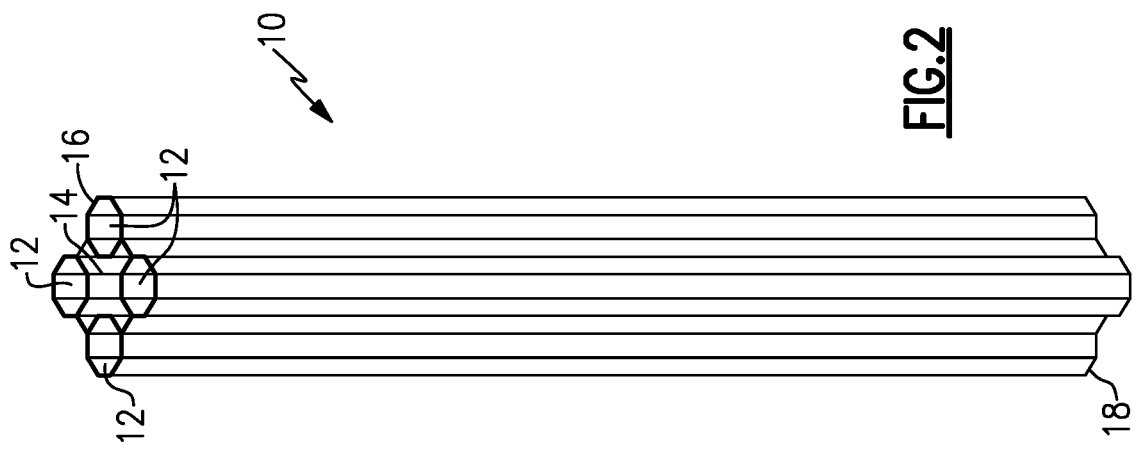
FIG. 2 is a perspective view of the multi-cell energy absorbing structure of FIG. 1.
Figure 1:
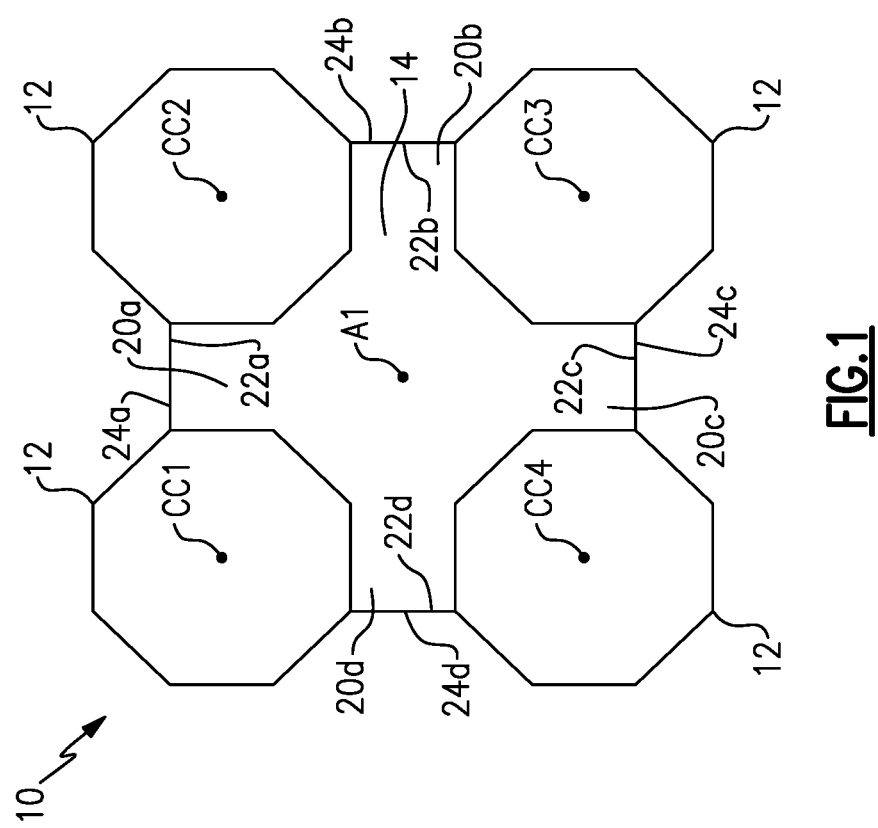
FIG. 1 illustrates a top view of one example cross-section of a multi-cell energy absorbing structure.

FIGS. 1-2 show a vehicle structural component 10 that is comprised a plurality of open cells 12 surrounding an open center section 14. The open center section 14 comprises a multi-corner open center. In one example, the plurality of open cells 12 each comprise a polygonal cross-section. In a further example, the polygonal cross-section comprises an octagonal cross-section.

In one example, the multi-corner open center is defined by at least eight corners. In another example, the multi-corner open center is defined by at least sixteen corners. The multi-corner open center could also be defined by more than sixteen corners as will be discussed below.

In the example shown in FIGS. 1-2, there are four open cells 12 that surround the open center section 14. The vehicle structural component 10 is defined by a length extending between first 16 and second 18 opposing ends. In one example, a cross-section of the vehicle structural component 10 is constant along the length. In one example, the vehicle structural component 10 comprises an extruded component that is made from a metallic material. The metallic material can be a steel alloy, titanium alloy, aluminum alloy, magnesium alloys, etc. for example. Optionally, other materials such as nylons, polymers, plastics, composites, fiber-reinforced composites, hybrid materials (combination of dissimilar materials), etc. could also be used.

The disclosed vehicle structural component 10 with the open cells 12 and open center section 14 comprises a tubular structure that behaves similar to a honeycomb structure. In one example, an aluminum extrusion is used to form the vehicle structural component 10 having the cross-section described above. This results in a structure that has less weight and higher impact absorbing performance, e.g. absorbs higher forces and more energy, as compared to traditional box cross-sections. The disclosed vehicle structural component 10 also exhibits a more stable and progressive folding pattern with smaller folding lobes when compared to traditional designs. Manufacturing processes other than extrusion could also be used to form the vehicle structural component 10 including stamping, molding, casting, machining, 3-D printing, or any other suitable manufacturing process.

Figure 3B:
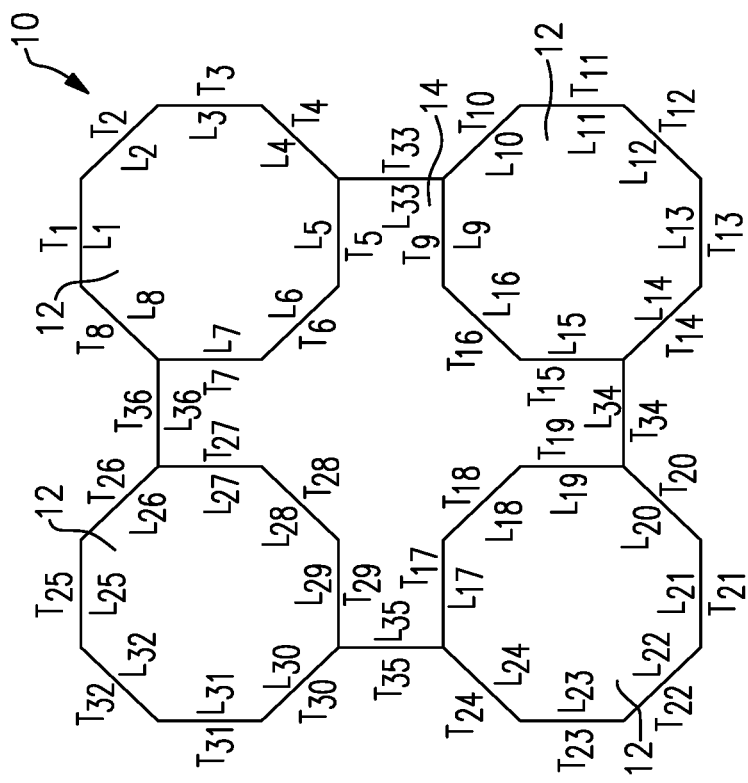
FIG. 3B shows lengths and thicknesses for the segments of FIG. 3A.
Figure 3A:
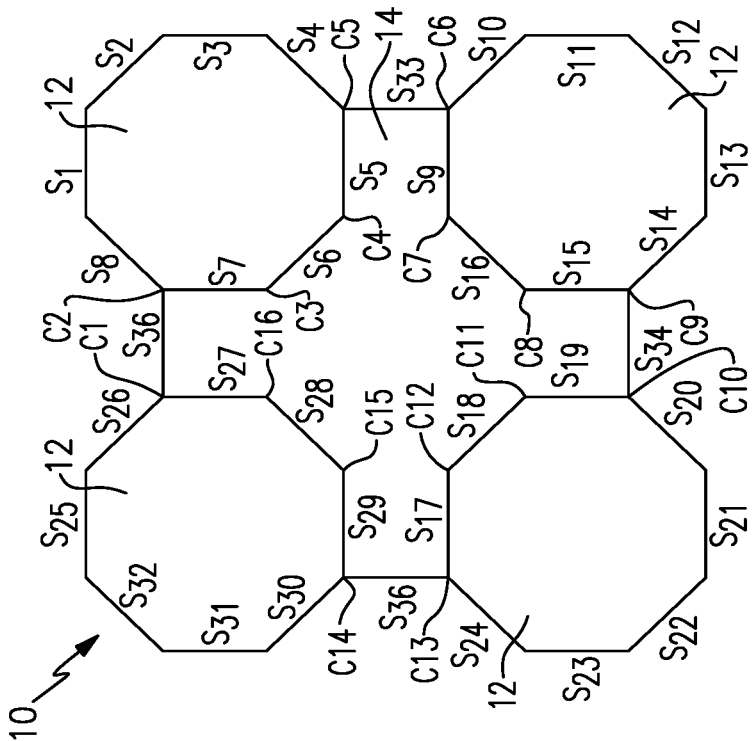
FIG. 3A is a view similar to FIG. 1, and which shows a plurality of segments that define the multi-cell energy absorbing structure.

As shown in FIG. 3A, the vehicle structural component 10 comprises a multi-cell structure that is defined by a plurality of wall segments S1 to S36. In the example shown, there are four octagon open cells 12 defined by wall segments S1 to S8, S9 to 16, S17 to S24, and S25 to S32. The four octagon open cells 12 are connected to each other by wall segments S33 to S36 to enclose the overall section and define the open center section 14. The open center section 14 thus comprises a multi-corner open center. Corners C1 to C16 define the open center section 14 and are located at inward facing portions of each of the open cells 12. The corners can have various bend radii.

In the example shown in FIG. 3A, there are four corners associated with each cell 12, resulting in 16 corners that form the open center section 14. The open center section 14 is a closed section in that it is completely bounded about its outer perimeter by the various wall segments but has a completely hollow/open interior along its entire length. In this example, there are no other structures such as cross-flanges, internal walls, etc. formed within the open center section 14.

FIG. 3B shows that each of the wall segments S1 to S36 of FIG. 3A has a corresponding length L1 to L36 and a corresponding thickness T1 to T36. The lengths L1 to L36 can vary for different connecting methods and various aspect ratios. The thicknesses T1 to T36 can be adjusted independently to provide a desired stiffness and strength scalability. In one example, a range of thicknesses of greater than 0.1 mm and less than 15.0 mm can be used for automotive applications. Additionally, angles between the various corners can be adjusted as needed to provide the desired stiffness/strength.

In one example, each cell 12 has wall thicknesses that vary between about 1/10000 to about 1/4 of wall lengths. There can be constant or variable thicknesses along each wall segment length to control local or global properties (in-plan or out-of-plan stress, strain, stiffness, peak load, impact force, impact energy, deformation pattern, etc.).

FIGS. 1-2 and 3A-3B show an example where the open center section has a center axis A1 (FIG. 1) and comprises a plurality of leg portions 20a-20d that extend radially away from the center axis A1 to distal ends 22a-22d. As shown, one leg portion 20a-20d extends between each adjacent pair of open cells 12. Each open cell 12 has a cell center CC1 to CC4. In one example, an end face 24a-24d of each distal end 22a-22d extends radially outwardly to at least the cell centers CC1-CC4 associated with the respective leg portion 20a-20d. In the example shown in FIGS. 1-2 and 3A-3B, the end face 24a-24d of each distal end 22a-22d extends radially beyond the cell centers CC1-CC4 associated with the respective leg portion 20a-20d.

Figure 4:
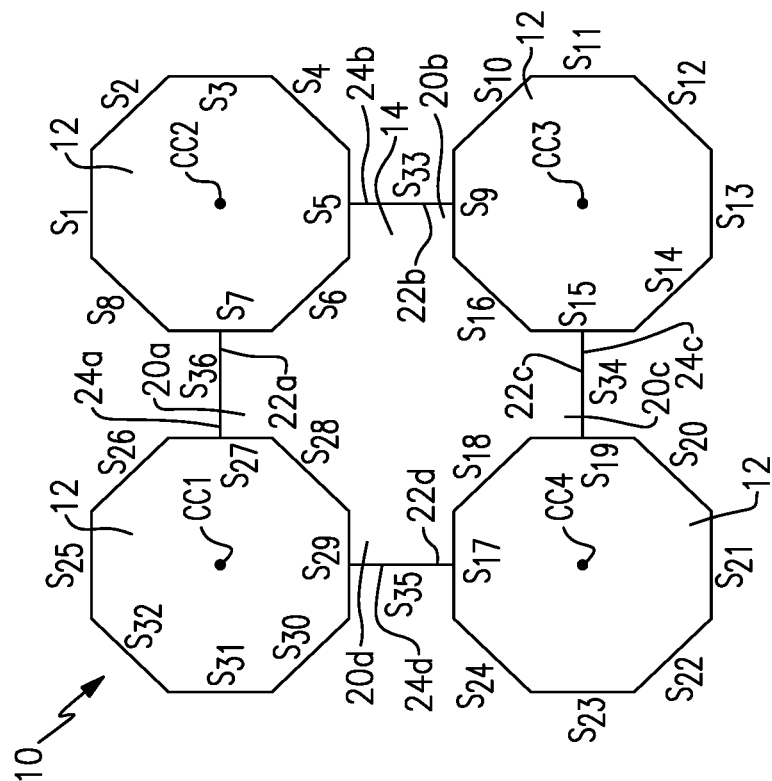
FIG. 4 is another example of a cross-section for a multi-cell energy absorbing structure.

FIGS. 4-9 show different example configurations for the open center section 14. In each of the examples, there are four octagon open cells 12. FIG. 4 shows a configuration similar to FIG. 1 but with shorter leg portions 20a-20d where the end face 24a-24d of each distal end 22a-22d extends radially outwardly to the cell centers CC1-CC4 associated with the respective leg portion 20a-20d. In this configuration, there are thirty-six segments S1 to S36 in the vehicle structural component 10, and sixteen segments and sixteen corners define the open center section 14.

Figure 5:
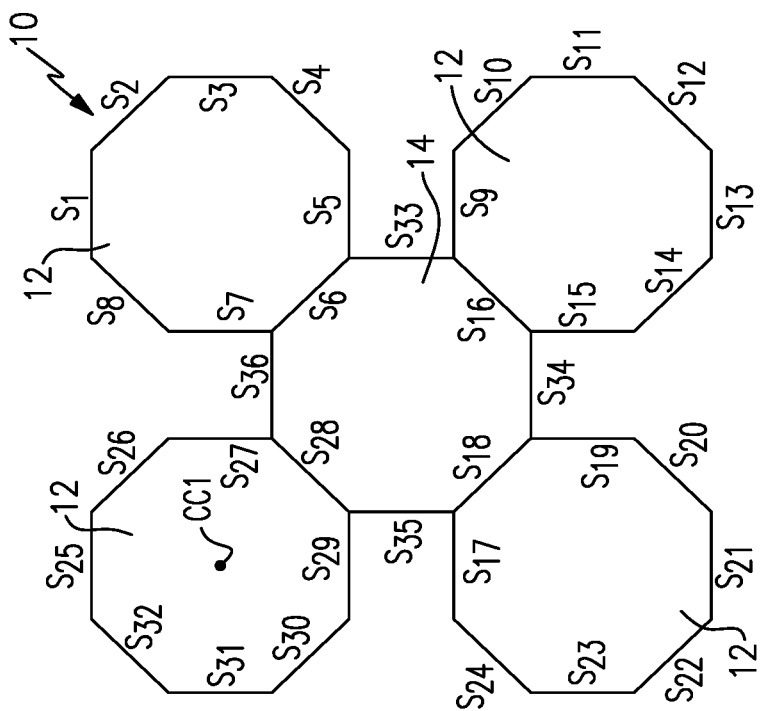
FIG. 5 is another example of a cross-section for a multi-cell energy absorbing structure.

FIG. 5 shows a configuration where the open center section 14 comprises an octagonal tube. In this example, there are thirty-six segments S1 to S36 in the vehicle structural component 10, and eight segments and eight corners define the open center section 14.

Figure 6:
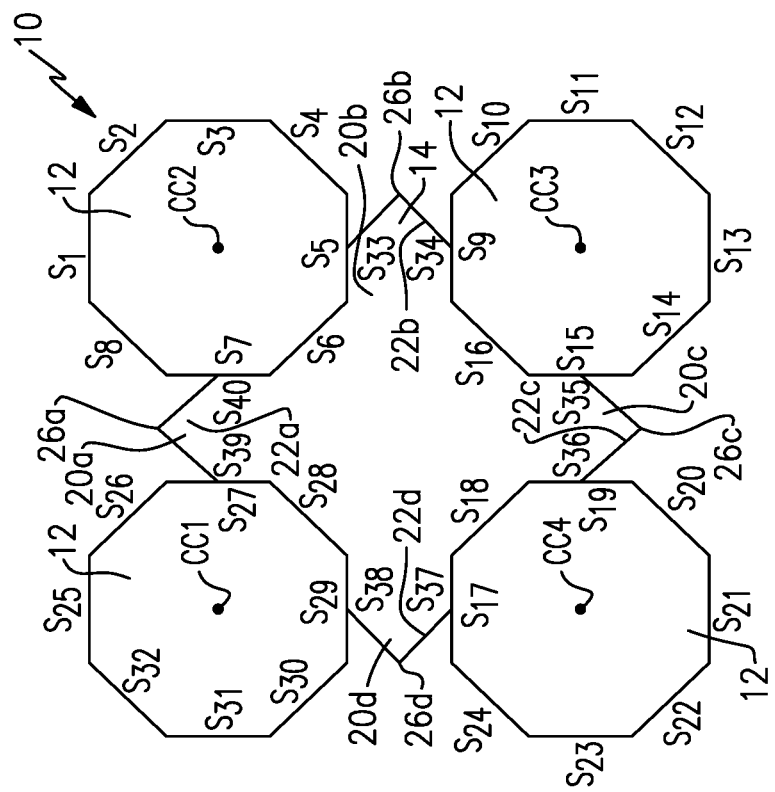
FIG. 6 is another example of a cross-section for a multi-cell energy absorbing structure.

FIG. 6 shows a configuration where the distal ends 22a-22d of the leg portions 20a-20d extend to an apex 26a-26d. The apex 26a-26d of each distal end 22a-22d extends radially outwardly beyond the cell centers CC1-CC4 associated with the respective leg portion 20a-20d. In this configuration, there are forty segments S1 to S40 in the vehicle structural component 10, and twenty segments and twenty corners define the open center section 14. In this example, the connecting locations for the center section 14 to the open cells 12 are at a mid-point location along a segment of the corresponding octagonal open cell 12.

Figure 7:
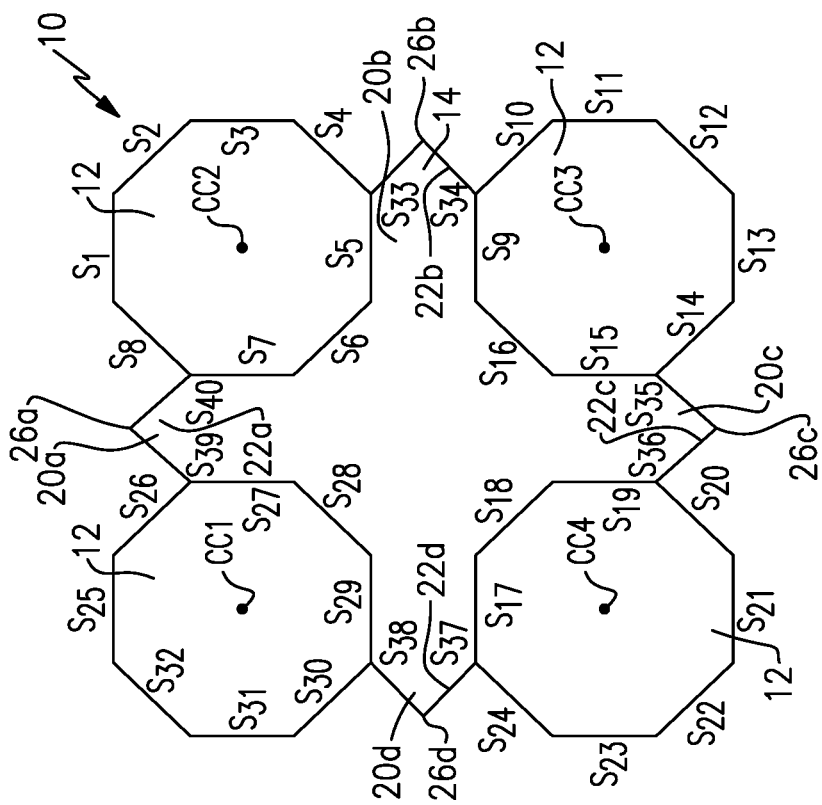
FIG. 7 is another example of a cross-section for a multi-cell energy absorbing structure.

FIG. 7 is a configuration similar to FIG. 6 but includes longer leg portions 20a-20d. In this example, the connecting locations for the center section 14 to the open cells 12 are at corner locations of the corresponding octagonal open cell 12.

Figure 9:
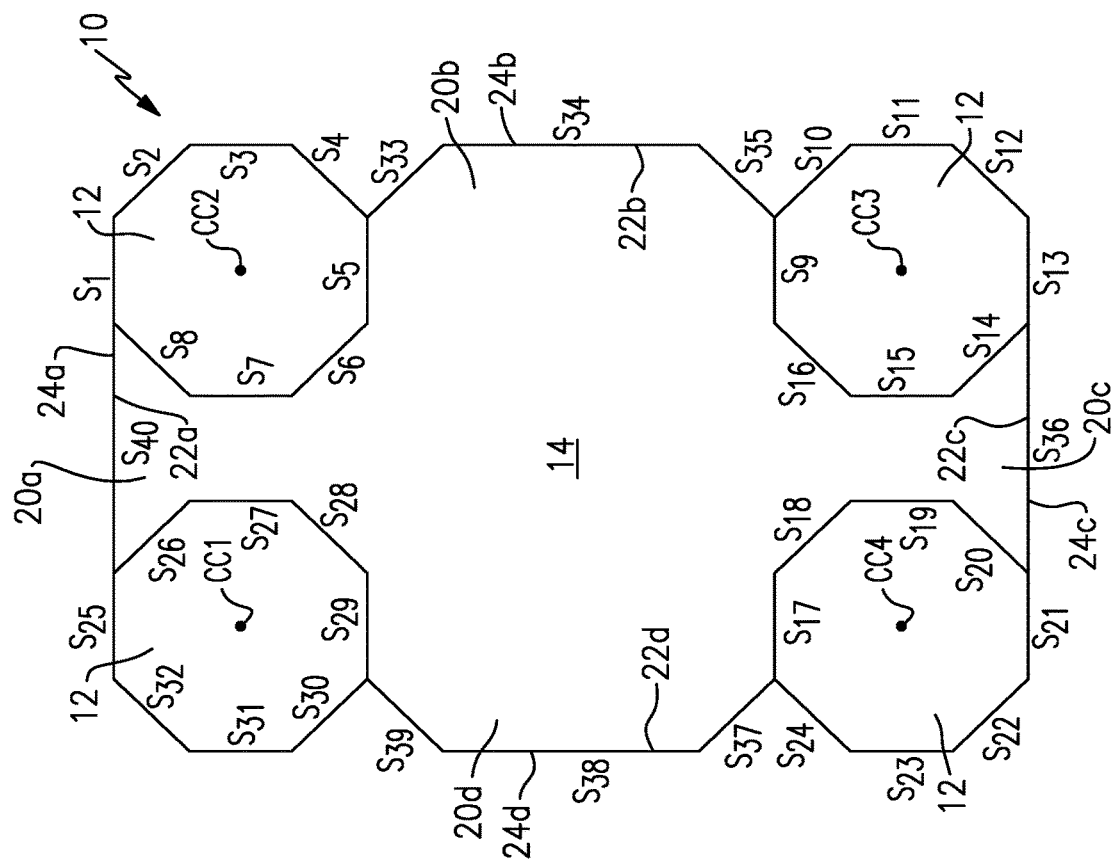
FIG. 9 is another example of a cross-section for a multi-cell energy absorbing structure.
Figure 8:
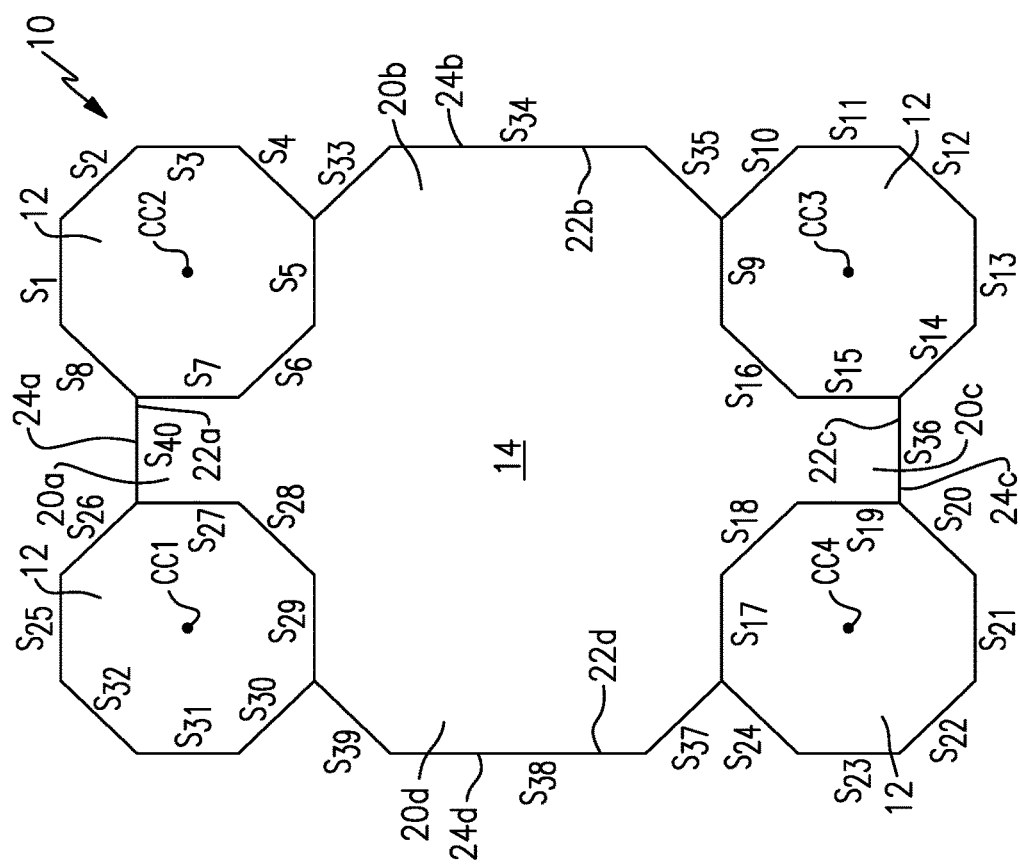
FIG. 8 is another example of a cross-section for a multi-cell energy absorbing structure.

FIGS. 8-9 show example configurations where the leg portions 20a-20d have different shapes within a common section. FIG. 8 shows an example where first 20a and third 20c leg portions are narrower than the second 20b and fourth 20d leg portions. In this configuration, there are forty segments S1 to S40 in the vehicle structural component 10, and twenty segments and twenty corners define the open center section 14. Further, in FIG. 8 the end faces 24b and 24d of the second 20b and fourth 20d leg portions are aligned with the outermost side segments S3, S11, S23, and S31, while the end faces 24a and 24c of the first 20a and third 20c leg portions do not extend to be aligned with the corresponding outermost side segments S1, S13, S21, and S25.

FIG. 9 shows a configuration similar to FIG. 8 but with the first 20a and third 20c leg portions extending such that the end faces 24a and 24c of the first 20a and third 20c leg portions are aligned with the corresponding outermost side segments S1, S13, S21, and S25.

Figure 10:
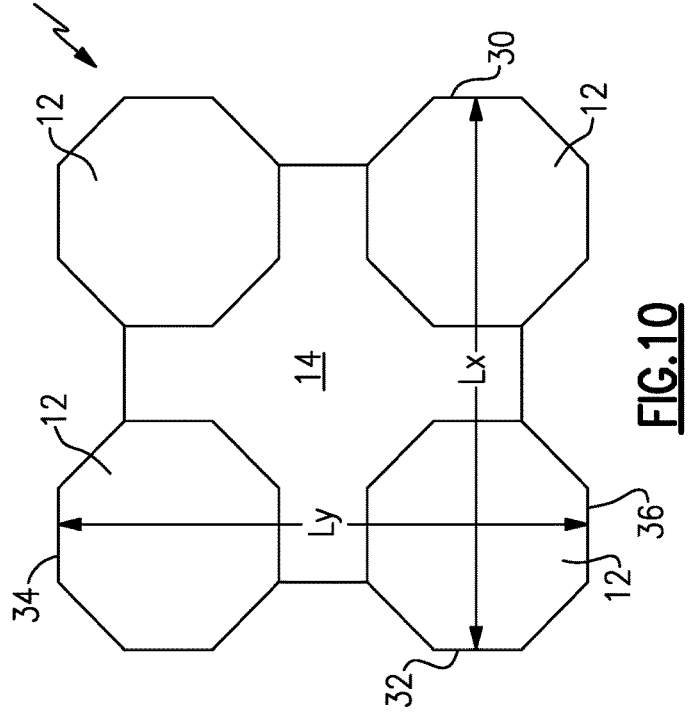
FIG. 10 shows a cross-section for a multi-cell energy absorbing structure that as an aspect ratio of 1.0.

FIG. 10 shows that each example configuration has an overall height Ly and an overall width Lx. The width Lx is defined in a first direction between opposing outermost surfaces 30, 32 of first and second sides of the vehicle structural component 10. The height Ly is defined in a second direction between opposing outermost surfaces 34, 36 of third and fourth sides of the vehicle structural component 10. In the example shown in FIG. 10, the first direction is perpendicular to the second direction. An aspect ratio for the section of the vehicle structural component 10 is defined the width Lx divided by the height Ly. In one example, the aspect ratio is within a range of greater than 0.25 and less than 4.0 (4.0>Lx/Ly>0.25).

Figure 12:
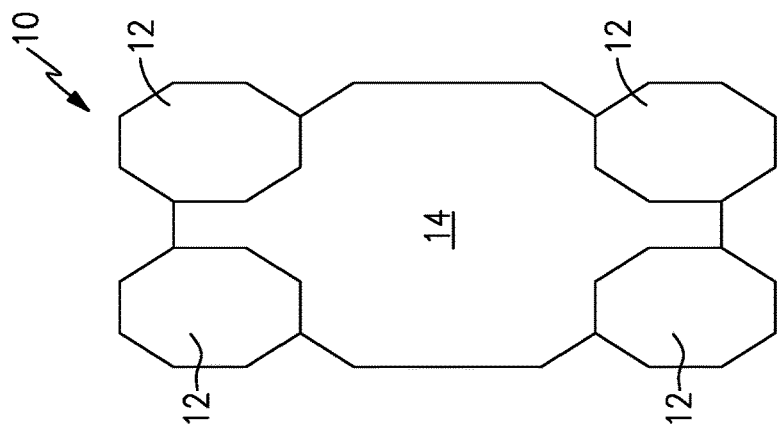
FIG. 12 shows a cross-section for a multi-cell energy absorbing structure that as an aspect ratio less than 1.0.
Figure 11:
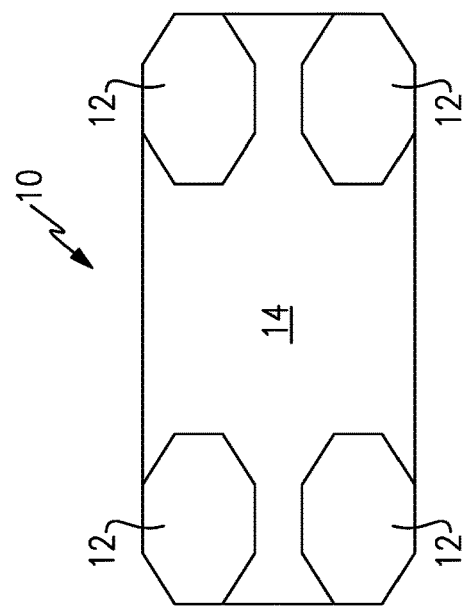
FIG. 11 shows a cross-section for a multi-cell energy absorbing structure that as an aspect ratio greater than 1.0.

FIG. 10 shows an example where the aspect ratio is equal to 1.0. FIG. 11 shows an example where the aspect ratio is greater than 1.0. FIG. 12 shows an example where the aspect ratio is less than 1.0. The aspect ratio can be adjusted for stiffness/strength scalability and design space constraints. Further, the vehicle structural component 10 does not need to be straight and the cross-section does not need to be uniform. Non-symmetrical shapes can be designed to control folding modes. Trigger holes, flanges, convolutions/indentations can be added to fine tune folding patterns and peak loads.

Figure 13:
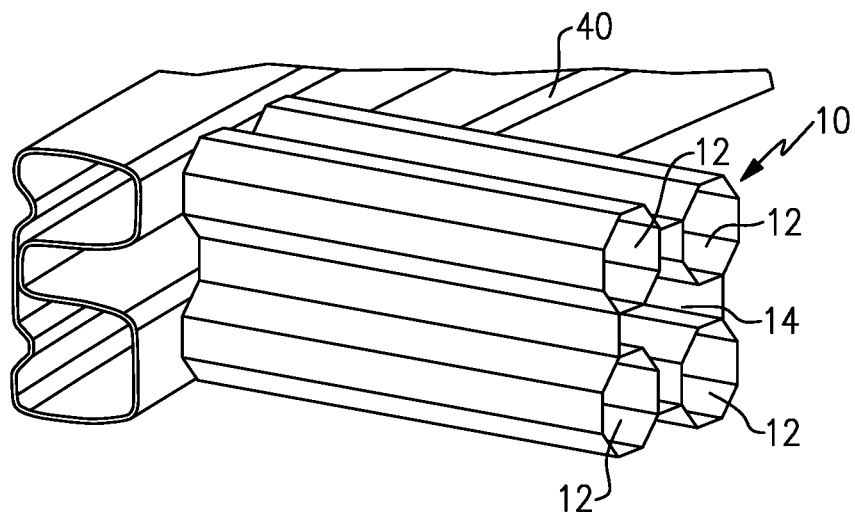
FIG. 13 shows the multi-cell energy absorbing structure of FIG. 2 abutting against a vehicle structural member.
Figure 14:
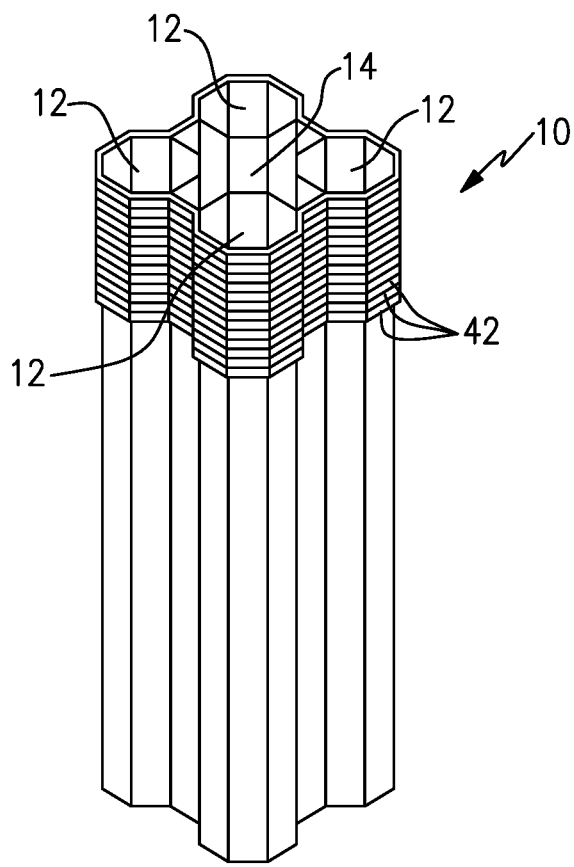
FIG. 14 is a perspective view of the multi-cell energy absorbing structure of FIG. 13 in an impacted condition.

FIG. 13 shows the multi-cell energy absorbing structural component 10 of FIG. 2 abutting against a vehicle structural member 40 such as a bumper beam, cross-rail, or frame member of a vehicle, for example. FIG. 14 shows the multi-cell energy absorbing structural component 10 of FIG. 13 after an impact against the vehicle structural member 40. As shown, the disclosed vehicle structural component 10 exhibits a stable and progressive folding pattern with small and consistent folding lobes 42. The subject configurations rely on the material of the structural component, the length of each segment, the thickness of each segment, and the angle of each corner to produce very small wavelengths during impact loads (as shown in the formed folding lobes 42) and to provide very high force and energy absorption. This folding pattern cannot be achieved by polymeric materials which require higher wavelengths (higher folding lobes) and greater wall thicknesses.

Figure 15A:
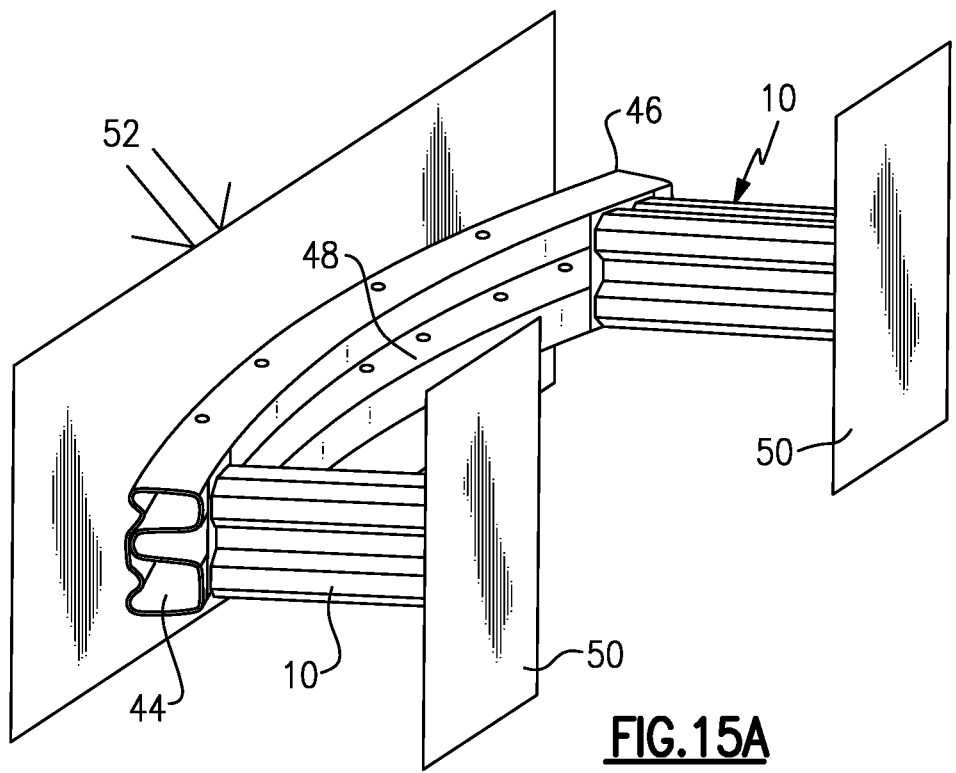
FIG. 15A is a perspective view of a pair of multi-cell energy absorbing structures on opposing ends of a bumper.
Figure 15B:
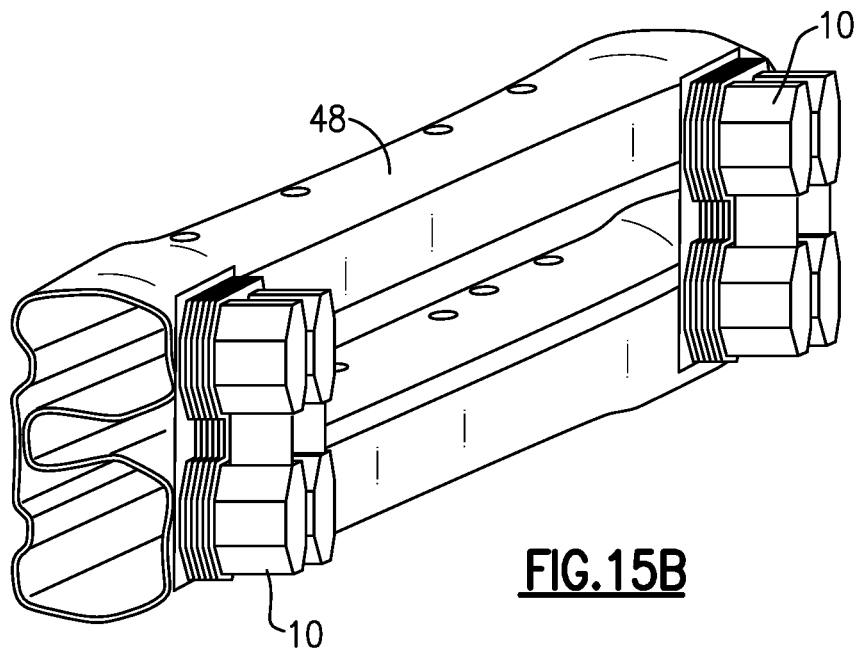
FIG. 15B shows the multi-cell energy absorbing structures after impact.

FIG. 15A is a perspective view of a pair of multi-cell energy absorbing structural components 10 on opposing ends 44, 46 of a bumper 48. One end of the structural components 10 are fixed to an inner face of the bumper 48 and the opposite end of the structural components 10 are fixed to another vehicle structure 50 such as a frame or beam, for example. FIG. 15B shows the multi-cell energy absorbing structural components 10 after an impact load 52 has been applied to a front of the bumper 48.

Figure 16A:
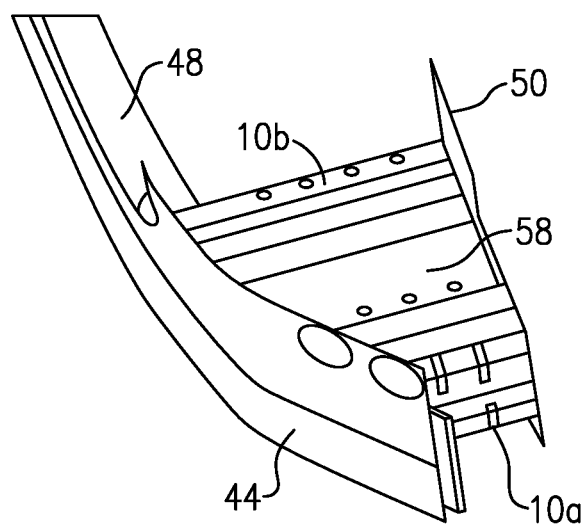
FIG. 16A shows an example of a pair of multi-cell energy absorbing structures that are connected to each other at one end of a bumper.
Figure 16B:
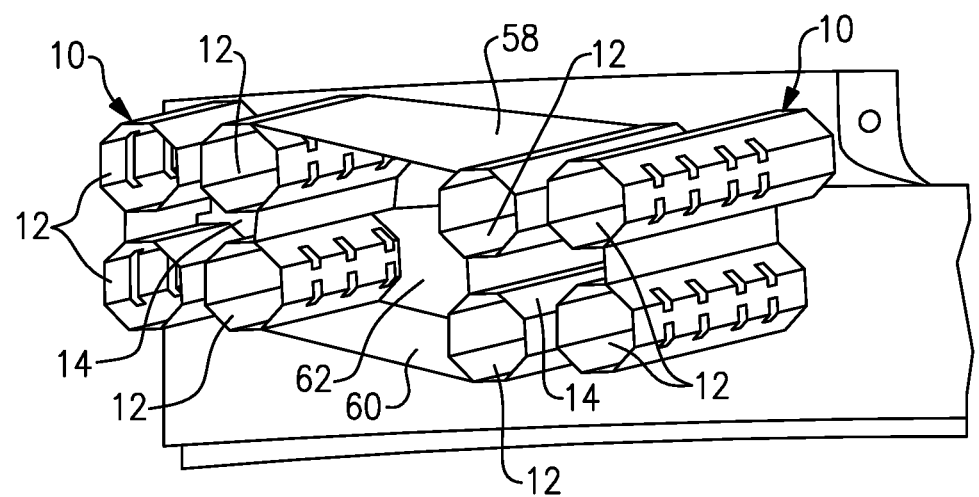
FIG. 16B is a perspective view of the multi-cell energy absorbing structures of FIG. 16A.

FIG. 16A shows an example of a pair of multi-cell energy absorbing structural components 10 that are connected to each other at one end 44 of the bumper 48. Another pair would be located at the other end 46 (FIG. 15A) of the bumper 48. The multi-cell energy absorbing structural components 10 are connected to each other with first 58 and second 60 plates. The first plate 58 is on one side of the multi-cell energy absorbing structural components 10 and the second plate 60 is on an opposite side of the multi-cell energy absorbing structural components 10 such that the first and second plates 58, 60 are spaced apart from each other by an open gap 62. In this example, the outer multi-cell energy absorbing structural component 10a has a shorter length than the inner multi-cell energy absorbing structural component 10b. This accommodates mounting of multiple multi-cell energy absorbing structural components 10 to vehicle structures that include a curved surface. Optionally, the multi-cell energy absorbing structural components 10a, 10b could have the same height. Optionally, the widths of the multi-cell energy absorbing structural components 10a, 10b could also be varied as needed.

Figure 17:
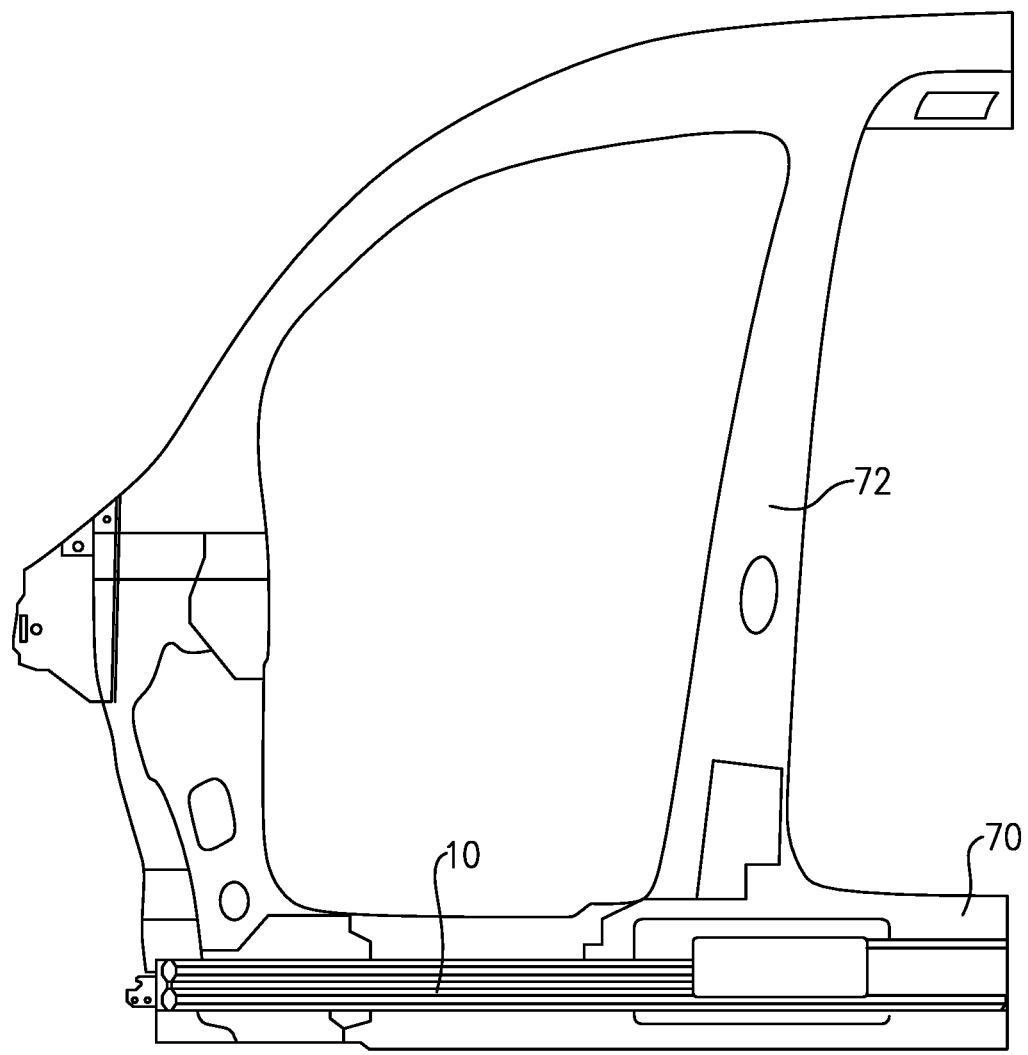
FIG. 17 shows an example of the multi-cell energy absorbing structure as installed inside a rocker.
Figure 18:
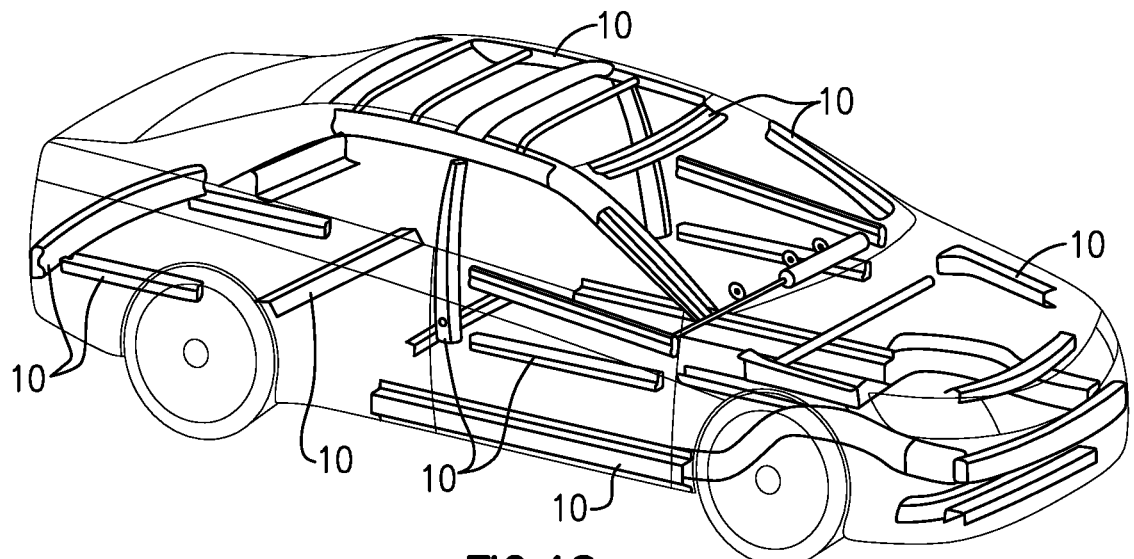
FIG. 18 shows an example of various locations in a passenger car where the multi-cell energy absorbing structure could be used.
Figure 19:
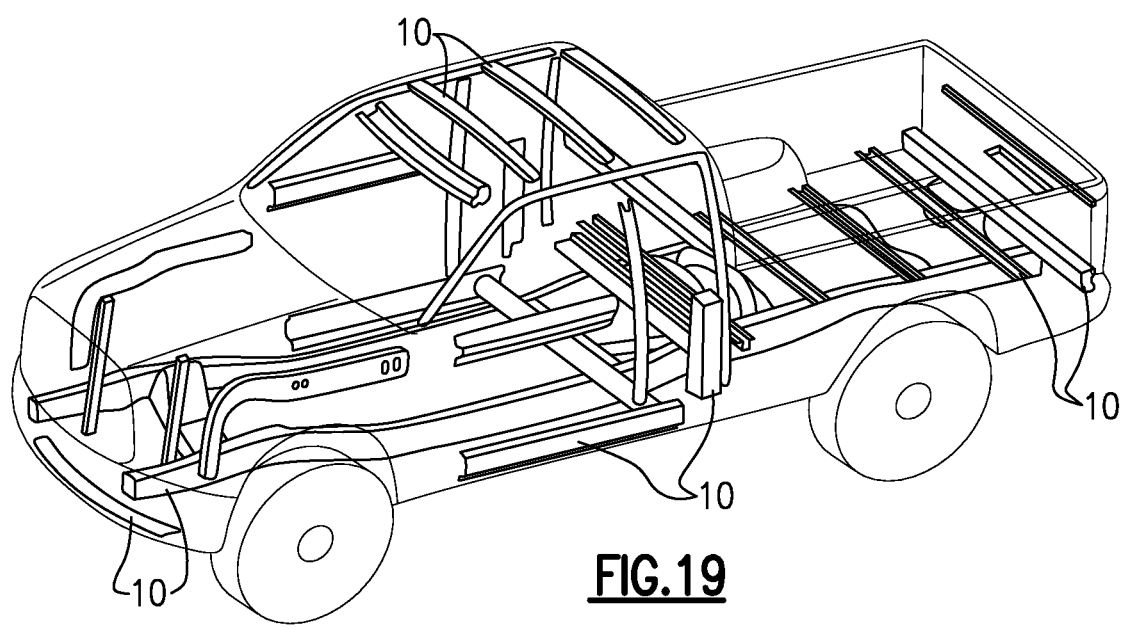
FIG. 19 shows an example of various locations in a truck where the multi-cell energy absorbing structure could be used.

FIG. 17 shows an example of the multi-cell energy absorbing structural component as installed inside a rocker 70 for a door frame 72. FIG. 18 shows an example of various locations in a passenger car where the multi-cell energy absorbing structural component 10 could be used. FIG. 19 shows an example of various locations in a truck where the multi-cell energy absorbing structural component 10 could be used. These locations include main structures such as front rails, mid rails, rear rails (e.g. extruded aluminum rails, molded thermo-plastics/CFRP/composite rails, etc.), side rails, etc. These multi-cell energy absorbing structural components can also be used for internal inserts and/or external energy absorbing components such as rockers, A/B/C/D-pillar, rails/bows, cross-members, door beams, floor cross-members, or any other load carrying or occupant protection components. The multi-cell energy absorbing structural component could also be used in other industries such as spacecraft, aircraft, high-speed watercraft, and high-speed train for similar applications.

The disclosed vehicle structural component 10 having the various cross-sections described above results in a structure that has less weight and higher impact absorbing performance, e.g. absorbs higher forces and more energy, as compared to traditional box cross-sections. The disclosed vehicle structural component 10 also exhibits more stable and progressive folding pattern with smaller folding lobes when compared to traditional designs. When the subject multi-cell energy absorbing structure is compared to similar applications in the industry, there is over a 40% weight savings with similar and/or improved performance. Further, the subject multi-cell energy absorbing structure provides for increased energy absorption in certain vehicle areas, such as a front of a vehicle for example, which corresponds to decreased energy absorption in other surrounding components that could extend into other vehicle areas.

The subject multi-cell energy absorbing structures can also be tailored for utilization at various different locations within a vehicle. There are many tunable parameters (corner angles can be adjusted as wells as length and thickness of each side can be adjusted independently), which allows flexible and sophisticated designs to fit different packaging spaces. The tunable parameters can be used to adjust the stiffness of different portions of the cross-section and maintain axial impact absorption of the member for various design conditions such as non-symmetric or off-center cross-sections. The disclosed multi-cell energy absorbing structure can be used to replace traditional configurations to maintain targeted impact absorption requirements with reduced thicknesses for weight and cost reduction.

Due to its smaller cross-section and small folding length, the disclosed multi-cell energy absorbing structure can be used for small vehicles and/or tight packaging areas. Octagonal cells can be reduced and aspect ratios can be adjusted for narrow design spaces. Additional flanges and/or connecting plates can be added to join other multi-cell structures and/or surrounding components.

In one example, deformable structures or foam materials can be used to fill the cavity of each cell for additional control of property, thermal and sound insulation, or other functions. Optionally, plates or sheets can be joined to the outside surfaces (top and bottom) of the structures for additional control of property, thermal and sound insulation or other functions. Joining methods, such as welding (e.g. spot welding, seam welding, laser welding, and friction stir welding), brazing, soldering, adhesive bonding, fastening, press fitting, riveting, screw, bolt, or other known joining methods, can be used to connect with other multi-cell structures and/or surrounding components.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a vehicle structural component including a plurality of open cells surrounding an open center section, wherein the open center section comprises a multi-corner open center, and wherein the open center section has a cross-sectional shape that is different than a cross-sectional shape of at least one of the plurality of open cells, and wherein the open center section has a center axis and comprises a plurality of leg portions extending radially away from the center axis to distal ends, and wherein one leg portion extends between each adjacent pair of open cells.

2. The apparatus according to claim 1, wherein the plurality of open cells each comprise a polygonal cross-section.

3. The apparatus according to claim 1, wherein the vehicle structural component is defined by a length extending between first and second opposing ends, and wherein a cross-section of the vehicle structural component is constant along the length.

4. The apparatus according to claim 3, wherein the vehicle structural component comprises an extruded component made from a metallic material.

5. The apparatus according to claim 1, wherein the multi-corner open center is defined by a plurality of wall segments that connect to the plurality of open cells, wherein each wall segment has a length and a thickness, and wherein the lengths and/or thickness can be adjust independently to provide a desired stiffness and strength.

6. The apparatus according to claim 1, wherein the vehicle structural component has a width defined in a first direction between opposing outermost surfaces of first and second sides of the vehicle structural component and a height defined in a second direction between opposing outermost surfaces of third and fourth sides of the vehicle structural component, and wherein an aspect ratio of width divided by height is within a range of greater than 0.25 and less than 4.0.

7. The apparatus according to claim 6, wherein the aspect ratio is 1.0.

8. The apparatus according to claim 1, wherein the multi-corner open center has an open area that is greater than an open area defined by one of the plurality of open cells.

9. An apparatus, comprising:
a vehicle structural component including a plurality of open cells surrounding an open center section, wherein the open center section comprises a multi-corner open center, and wherein the open center section has a cross-sectional shape that is different than a cross-sectional shape of at least one of the plurality of open cells, wherein the polygonal cross-section comprises an octagonal cross-section.

10. The apparatus according to claim 9, wherein the multi-corner open center is defined by at least eight wall segments and at least eight corners.

11. An apparatus, comprising:
a vehicle structural component including a plurality of open cells surrounding an open center section, wherein the open center section comprises a multi-corner open center;
wherein the plurality of open cells each comprise an octagonal cross-section; and
wherein the multi-corner open center is defined by at least sixteen wall segments and at least sixteen corners.

12. The apparatus according to claim 11, wherein the plurality of open cells comprises four open cells.

13. An apparatus, comprising:
a vehicle structural component comprising an extruded component that is made from a metallic material, and wherein the vehicle structural component includes a plurality of open cells surrounding an open center section, wherein the plurality of open cells each comprise a polygonal cross-section and the open center section comprises a multi-corner open center, and wherein the open center section has a center axis and comprises a plurality of leg portions extending radially away from the center axis to distal ends, and wherein one leg portion extends between each adjacent pair of open cells.

14. The apparatus according to claim 13, wherein each open cell has a cell center, and wherein an end face of each distal end extends radially outwardly to at least the cell centers associated with the respective leg portion.

15. The apparatus according to claim 14, wherein the end face of each distal end extends radially beyond the cell centers associated with the respective leg portion.

16. The apparatus according to claim 13, wherein the polygonal cross-section comprises an octagonal cross-section, and wherein the multi-corner open center is defined by at least eight wall segments and at least eight corners.

17. The apparatus according to claim 16, wherein the multi-corner open center is defined by at least sixteen wall segments and at least sixteen corners, and wherein the plurality of open cells comprises four open cells.

18. The apparatus according to claim 13, wherein the vehicle structural component is defined by a length extending between first and second opposing ends, and wherein a cross-section of the vehicle structural component is constant along the length.

19. A method comprising:
extruding a vehicle structural component from a metallic material, wherein the vehicle structural component includes a plurality of open cells surrounding an open center section, wherein the plurality of open cells each comprise a polygonal cross-section and the open center section comprises a multi-corner open center that has an open area that is greater than an open area defined by one of the plurality of open cells, wherein the polygonal cross-section comprises an octagonal cross-section, and wherein the multi-corner open center is defined by at least eight wall segments and at least eight corners.

20. The method according to claim 19, wherein the open center section has a cross-sectional shape that is different than a cross-sectional shape of at least one of the plurality of open cells.

21. The method according to claim 19, wherein the plurality of open cells each comprise an octagonal cross-section, and wherein the multi-corner open center is defined by at least sixteen wall segments and at least sixteen corners.

* * * * *

UNITED STATES PATENT AND TRADEMARK OFFICE
CERTIFICATE OF CORRECTION

PATENT NO. : 11,167,797 B2
APPLICATION NO. : 16/658406
DATED : November 9, 2021
INVENTOR(S) : Tau Tyan et al.

It is certified that error appears in the above-identified patent and that said Letters Patent is hereby corrected as shown below:

In the Claims

In Claim 9, Column 8, Line 65-66; after "of the plurality of open cells," insert --wherein the plurality of open cells each comprise a polygonal cross-section, and--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*